United States Patent [19]
Tamer

[11] Patent Number: 4,956,561
[45] Date of Patent: Sep. 11, 1990

[54] SMART POWER CONNECTOR

[75] Inventor: Antanios B. Tamer, Peoria, Ill.

[73] Assignee: Caterpillar Inc., Peoria, Ill.

[21] Appl. No.: 290,222

[22] Filed: Dec. 27, 1988

[51] Int. Cl.[5] .............................. H02G 1/00; H01R 9/0

[52] U.S. Cl. .............................. 307/10.1; 439/34; 439/76; 439/638; 439/709; 174/52.2; 307/40; 324/503

[58] Field of Search ....................... 307/9.1, 10.1–10.8, 307/32, 40, 132, 131; 361/422, 390–418, 373, 386, 388; 337/266, 242, 247, 283, 206; 340/900, 425.5, 457, 650, 652, 663, 584, 825.04–825.07, 438, 455, 458; 174/52.1, 72 A, 52.2; 439/34, 35, 36, 220, 206, 76, 77, 502, 503, 544, 547, 632, 638, 639, 650, 653, 654, 709, 715, 722; 324/503; 364/424.03; 370/8, 15; 371/22.6; 375/10, 36; 123/480

[56] References Cited

U.S. PATENT DOCUMENTS

| | | | |
|---|---|---|---|
| 4,302,841 | 11/1981 | McCulloch | 371/70 |
| 4,368,349 | 1/1983 | Donley et al. | 174/52.2 |
| 4,528,662 | 7/1985 | Floyd et al. | 370/92 |
| 4,530,085 | 7/1985 | Hamada et al. | 370/15 |
| 4,538,168 | 8/1985 | Van Dyk Soerewyn | 357/72 |
| 4,578,591 | 3/1986 | Floyd et al. | 307/10 R |
| 4,584,487 | 4/1986 | Hesse et al. | 307/10 R |
| 4,603,930 | 8/1986 | Ito | 361/399 X |
| 4,639,609 | 1/1987 | Floyd et al. | 307/10 R |
| 4,690,475 | 9/1987 | McElroy | 439/502 |
| 4,703,397 | 10/1987 | Minoura et al. | 361/428 |
| 4,723,196 | 2/1988 | Hofmeister et al. | 361/399 |
| 4,736,367 | 4/1988 | Wroblewski | 340/825.08 |
| 4,779,126 | 1/1989 | Kruse et al. | 361/101 |

*Primary Examiner*—A. D. Pellinen
*Assistant Examiner*—David Osborn
*Attorney, Agent, or Firm*—Wei Wei Jeang; Stephen L. Noe

[57] ABSTRACT

An electrical connector for use in a vehicular smart power multiplexing network is disclosed. Smart power connectors provide for connections between the power network and the various peripheral devices and components in a vehicle. The connector is comprised of two body portions which are electrically coupled when closed. The first body portion includes three connectors for electrical connection to the power network and the peripheral devices and components. The second body portion includes the smart power circuit and heat sink for dissipating heat generated by the power stage components. The smart power connector also has diagnostic capabilities for detecting device and component load failures.

22 Claims, 3 Drawing Sheets

SMART POWER CONNECTOR

DESCRIPTION

1. Technical Field

This invention relates generally to a load multiplexing network and more particularly, to an electrical connector for controlling the flow of electrical current from the electrical power network to a peripheral device in a vehicle smart power multiplexing system.

2. Background

Various multiplexing systems are implemented today, especially on vehicles where a number of components and peripheral devices require electrical connection to a power source. Some type of electrical connection is used in these systems, which typically enable the electrical connection of a vehicle peripheral device to a multiplexing system containing a central control module. The peripheral device control module controls the flow of electrical current from the power network to the peripheral device in response to a condition prescribed by the central control module.

Examples of a vehicle multiplexing system are described in U.S. Pat. Nos. 4,302,841 issued to McCulloch on Nov. 24, 1981, and in 4,528,662 issued to Floyd et al. on July 9, 1985. In each example a vehicle electrical system is disclosed including a central power network with a central control module and a plurality of peripheral device control modules and their attached associated peripheral devices. The central control module generates a control signal in response to a switch setting at a console. The control signal is transmitted to the peripheral device control modules which then control the peripheral devices to perform a function as specified by the received control signal.

Multiplexed power networks significantly reduce the number and length of wires used and greatly simplify the wiring harness on a vehicle, but they are not without problems. Current practice prescribes connecting the modules which are physically separate of the harness by splicing the network wires. One recognized problem with such mulitplexing network connections are difficulties in the initial assembly and installation of the vehicle power harness. The resultant power network is also inflexible in its configuration. Difficulties arise when the network layout is to be altered, such as the addition or deletion of a control module or peripheral device. Limitations are placed on network reconfiguration due to the fixed lengths of harnesses already in place and the method of hard wiring electrical connection. The network implemented this way is not easily expanded to accommodate more control modules or devices.

Multiplexing systems for earthmoving equipment operate in harsh environments. The control modules and the peripheral devices are located throughout the vehicle, where they may be exposed to a wide temperature range, moisture, pollutants and vibration. Consequently, The control devices have a relatively high failure rate. Therefore, device fault detection and diagnosis are essential to ensure vehicle reliability.

The instant invention is directed to overcome the problems and satisfy the requirements as set forth above.

DISCLOSURE OF THE INVENTION

An object of the invention is to provide an electrical connector for controlling the flow of electric power to a plurality of peripheral devices in a vehicular loop network. The network includes a plurality of data and power lines, and is controlled by a main controller module.

In one aspect of the present invention, the smart power connector includes a printed circuit board having electrical components mounted thereon, and a heat conducting element being in heat transfer relation with respect to at least one of said electrical components, the heat conducting element being mounted on said printed circuit board. The connector further includes first housing portion having first and second connecting means for electrical connection to the vehicular network, and third connecting means for electrical connection to the plurality of peripheral devices. A second housing portion retains the printed circuit board and heat conducting element, the second housing portion being adapted to overlie the first housing portion. The connector also includes a plurality of electrical terminals disposed in the second housing portion and adapted for electrical connection to the first, second and third connecting means when the first and second housing portions are aligned and closed together. The smart power connector is constructed so that the first, second and third connecting means each has first and second end portions, the first end portions being securely mounted to said first housing portion, and the second end portions being detachable from said first end portion, and are electrically connectable with one another.

In another aspect of the present invention, the smart power connector includes first and second body portions. The first body portion includes first, second and third inline connectors. Also included are a plurality of first conductors electrically coupling the first and second inline connectors. The first conductors are electrically coupled to a plurality of first terminals. A plurality of second conductors electrically couple a plurality of second terminals and the third inline connector. The first and second inline connectors are coupled to the power and data lines of the network, and the third inline connector are connectable to peripheral devices. The second body portion includes a plurality of third terminals adapted to electrically mate with the plurality of first terminals, and another plurality of fourth terminals adapted to electrically mate with the plurality of second terminals. The terminals are aligned when the first and second body portions are aligned at all four corners, and are electrically connected as the two portions are pressed close and remain connected as the body portions are fastened together.

The connector further includes a printed circuit board mounted in the second body portion. The circuit advantageously includes means for selectively controlling the flow of electric power to the peripheral devices. This includes voltage regulating means for converting the vehicle power voltage level to integrated circuit voltage level, communication means for receiving commands on the data lines, processing means for selectively delivering an on/off signal or a pulse width modulated signal in response to the commands, and power switches for delivering power to the peripheral devices. Peripheral device diagnostics are also performed and fault indication messages relayed back to the main controller module.

Another feature of the smart power connector advantageously includes potting material for electrical isolation of the conductors and the electrical circuit, and heat sink for heat dissipation.

The instant invention provides an electrical connector capable of smart power switching, and is easily attached to or detached from the multiplexed power network for reconfiguration or repairing. Any change in accessories can also be easily accommodated. The electrical connector is also packaged to withstand the harsh environment typical of vehicular applications. The invention also includes other features and advantages which will become apparent from a more detailed study of the drawings and specification.

BRIEF DESCRIPTION OF THE DRAWINGS

For a better understanding of the present invention, reference may be made to the accompanying drawings, in which a preferred embodiment is illustrated.

BEST MODE FOR CARRYING OUT THE INVENTION

Figure 1:
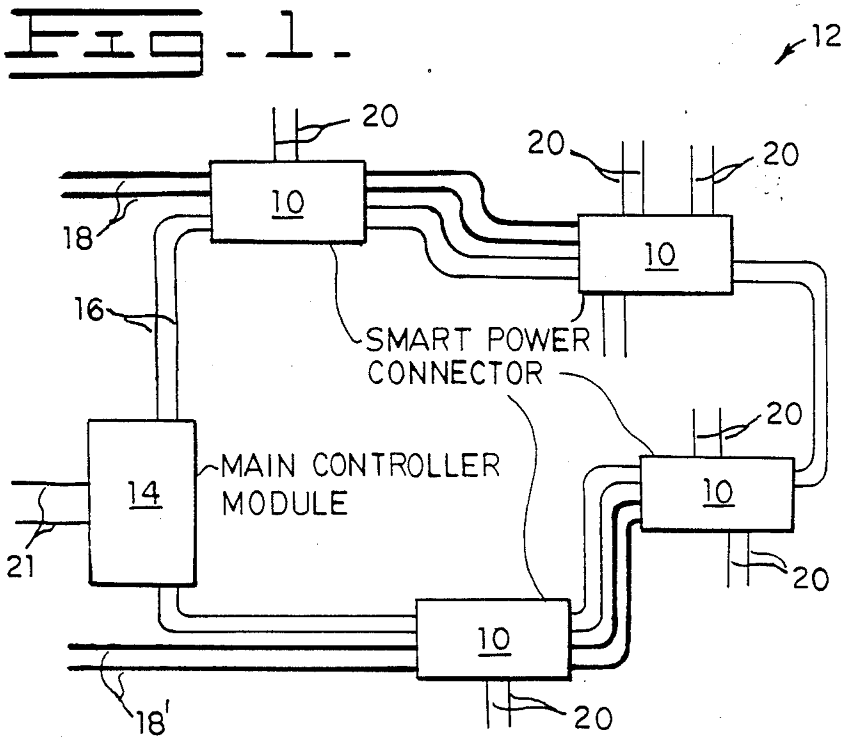
FIG. 1 is a schematic view of a multiplexing network containing a main controller module, smart power connectors, and interconnecting power and data lines.

FIG. 1 shows a schematic of a load multiplexing network 12. The network is controlled by a main controller module 14, which issues commands in response to operator input or to a preselected condition input on lines 21. A plurality of smart power connectors 10 are located throughout a vehicle (not shown) and interconnected by power lines 18,18', and data lines 16,16'. Advantageously, at least two sets of power lines 18,18' carry electrical power to different parts of the vehicle to prevent total power outage in the event of a short or open circuit. The preferred embodiment includes at least four such multiplexed networks on a single vehicle. The data lines 16 consist of a twisted pair on RS485 serial lines, but alternatives such as optical fiber links can also be used. The data loop carries commands and diagnostic information between the main controller module 14 and the smart power connectors 10. Peripheral devices and vehicle components (not shown) are connected to the smart power connectors 10 via load lines 20. Climate control components, solenoids, head lamps, windshield wiper motors are examples of vehicle components that can be monitored and controlled by the smart power connectors 10.

Figure 2:
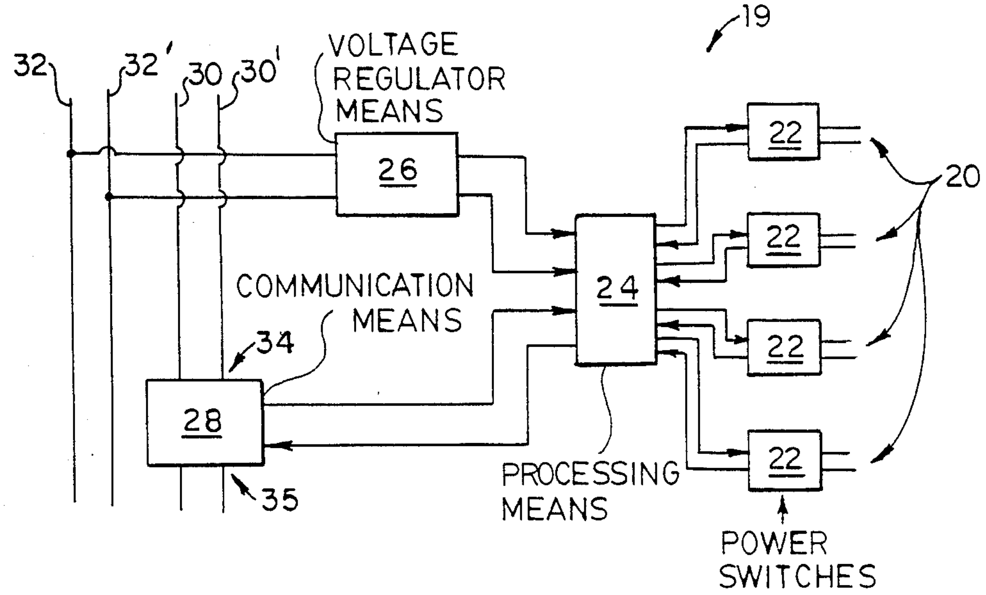
FIG. 2 is a schematic of an electric circuit in a smart power connector.

FIG. 2 is a schematic representation of the electric circuit 21 in the smart power connector. Voltage regulating means 26 converts the vehicle accessory voltage level on lines 32,32', typically 24 volts, to a lower level, such as 5 volts, to support the integrated circuit 21 in the connector. The data on the data lines 30,30' are received and transmitted through two ports 34,35 of the communication means 28. Communication means 28 receives commands on the data lines 30,30' at one of the two ports 34,35, and passes the commands to processing means 24. Processing means 24 decodes the destination address contained in the command and determines if it matched its own address. If the address does not match, the processing means 24 retransmits the command via communication means 28, and the command is put back on the data lines 30,30' in the same direction in the loop as the previous transmission, i.e. if the command was received at port one, it is retransmitted at port two, and vice versa. In the case of an address match, the processing means 24 directs one of the power switches 22 to "turn on" its load (not shown) as specified by the received command. The power switch 22 in turn returns a status signal for the loads reflecting load abnormalities such as open circuit, short circuit, temperature exceeding a preset limit, and output voltage under a preset limit. These power switches are commercially available.

Figure 4:
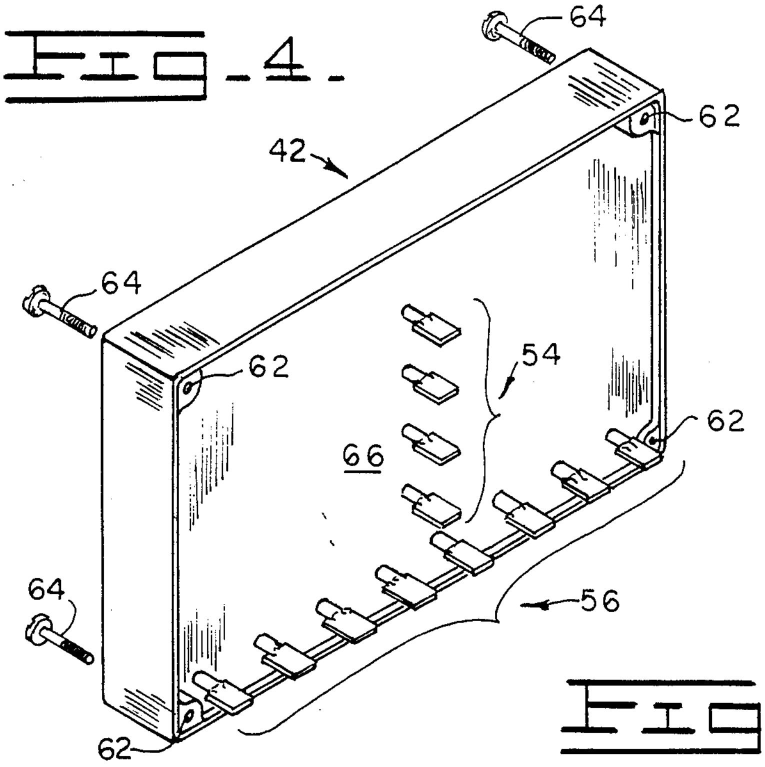
FIG. 4 is an isometric view of the second body portion of the smart power connector, oriented above the first body portion to show alignment.
Figure 3:
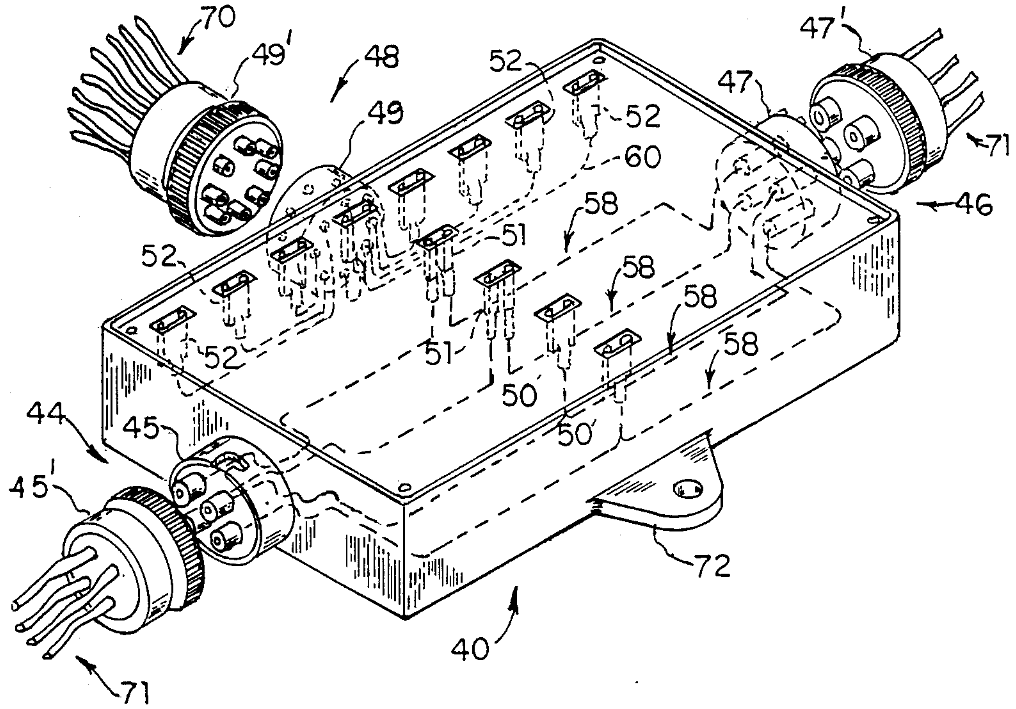
FIG. 3 is an isometric view of the first body portion of a smart power connector.

FIG. 3 and FIG. 4 are isometric views of the smart power connector 10 with two body portions 40,42 oriented to show mating alignment. First and second body portions 40,42 are advantageously aluminum castings, but other materials and construction such as a potting brick are also feasible. The first body portion 40 includes first and second inline connectors 44,46 which enable electrical coupling between the smart power connector and the power and data lines 18,18',16,16'. The first and second inline connectors 44,46 each consist of two end portions 44,45',47,47'. In the preferred embodiment of the apparatus 10, end portions 45',47' are electrically connectable with one another. The ability to connect the end portions 45',47' provides a way to easily reestablish electrical continuity if the connector 10 is deleted from the network. The third inline connector 48 on the first body portion 40 enables electrical connection between the peripheral devices and the smart power connector 10, and can accommodate up to four devices. The number of devices per connector is variable depending on system configuration and specifications. The third inline connector 48 also has first and second end portions 49,49' which enable easy connection and disconnection of the connector 10 to the peripheral device wiring harness 70. The inline connectors 44,46,48 each has a plurality of electrical terminals for the power and data connections. In the preferred embodiment, the inline connectors include electrical terminals of different sized gauges for power and data transmission. The inline connectors 44,46,48 as described are commercially available.

In the smart power connector 10, the electrical terminals of the first and second inline connectors 44,46 are electrically coupled by four conductors 58. The conductors 58 are preferably strips of metal stamped on the inner-bottom side of the first body portion 40, and electrically insulated from the rest of the connector in potting material. In instances where flexible wires are used instead of the stamped metal strips, the potting material immobilizes the wires to prevent breakage in addition to providing electrical insulation. Also set in the pot inside the connector 10 are electrical terminals 50,51,52. The terminals 50,51 provide for electrical connections between the power and data lines of the power network to the smart power connector circuit 21. The terminals 50,51 consist of two types of terminals for power and data transmission. The two power terminals 50 electrically couple the the metal strips carrying power to the smart power connector circuit 21. The data terminals 51 are of two portion construction, each portion connected to one data line of one of the inline connectors 44,46. This is so that the connector circuit 21 is included in the data loop with a data port at each side of the terminal 51. An electrical insulation is preferably installed between the forked portions of the data terminals 51. The other terminals 52 of the first body portion provide for electrical connections between the smart power connector circuit 21 and the peripheral device harness 70. Each peripheral device load requires two power lines to the smart power connector 10, one power and one ground, for a total of eight terminals.

The second body portion 42 of the smart power connector 10 includes a printed circuit board 66 mounted and potted therein. The printed circuit board 66 contains the electric circuit 21 shown in FIG. 2. One set of terminals 54 of the second body portion 42 consists of four male terminals adapted to electrically couple with the power and data terminals 50,51 of the first body portion 40. The peripheral device terminals 56 in the second body portion 42 consists of eight male terminals adapted to electrically couple with the eight terminals 52 in the first body portion 40. Advantageously, the printed circuit board 66 and the terminals 54,56 are potted for electrical insulation and vibration protection. The terminals 54,56 of the second body portion 42 are aligned with the terminals 50,51,52 of the first body portion 40 when the two body portions 40,42 are oriented and aligned one on top of another. The male and female terminals 50,51,52,54,56 further are electrically engaged when the two body portions 40,42 are aligned and pressed together. Fastening means 62,64 secures the body portions 40,42 together, and vehicle mounting means 72 mounts the smart power connector 10 to the vehicle.

Figure 5:
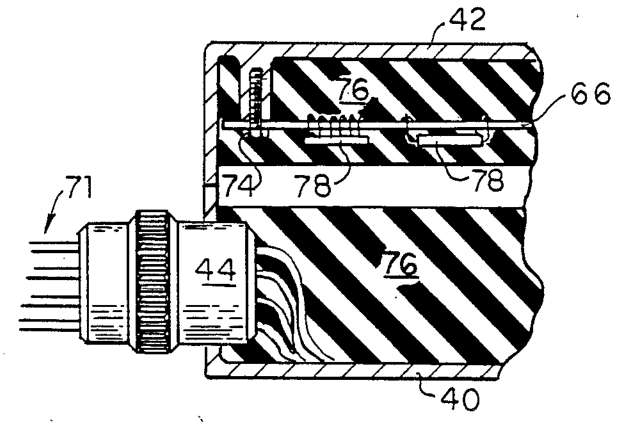
FIG. 5 is a fragmentary sectional view through the mated body portions and showing one embodiment of circuit board mounting.

FIG. 5 is a fragmentary sectional view through the mated two body portions showing an embodiment for mounting the printed circuit board 66 to the second body portion 42. An attachment eye 75 is formed on the inner region of the second body portion 42, and adapted to receive a screw 74. Other conventional methods for mounting a circuit board inside a housing known in the art can also be used. FIG. 5 additionally shows the location of the potting material with respect to the circuit board 66 and the electrical components 78.

Figure 6:
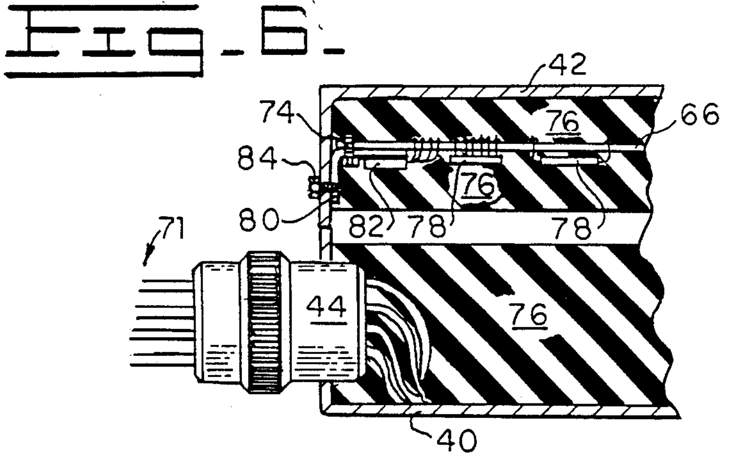
FIG. 6 is a fragmentary sectional view through the mated body portions and showing a heat sink arrangement.

Referring to FIG. 6, a printed circuit board 66 mounted with a heat sink 80 is shown. The power stage components 82 such as power switches and drivers are attached to the heat sink 80 and the circuit board 66 with a screw 74. The heat sink 80 in addition is in contact to the second body portion 42 wall and secured thereto with another screw 84. This is repeated at the other end of the heat sink. Aluminum is the preferred metal for a heat sink because of its light weight and heat conducting properties. Accordingly, heat from the power stage components 82 is dissipated through the larger surface areas of the heat sink 80 and the housing. Advantageously, the two mounting methods as shown in FIGS. 5 and 6 are combined in one embodiment. Typically, in the art of electronic packaging, a circuit board is mounted to a housing at five points: in the center and at four corners. The heat sink method as shown in FIG. 6 can be implemented at one of four corners of the housing and a conventional mounting method such as shown in FIG. 5 can be implemented at the three other corners and in the center.

Figure 7:
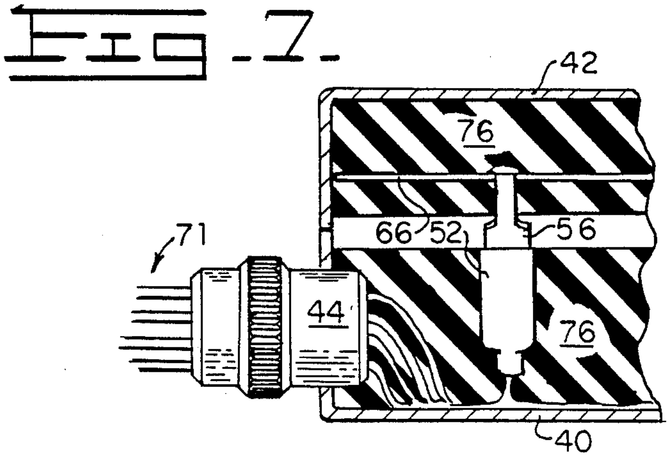
FIG. 7 is a fragmentary sectional view through the mated body portions and showing electrical contact between the first and second body portions.

FIG. 7 is a fragmentary sectional view of the two mated body portions 40,42 showing electrical engagement of a female and male power terminal 52,56. The data male and female terminals 54,51 are similarly coupled. The male terminals 54,56 are advantageously mounted on a circuit board 66 and soldered thereon to provide for electrical connection to the circuit. The female terminals 51,52 are preferably set in pot within the first body portion 40.

INDUSTRIAL APPLICABILITY

The operation of the smart power connector 10 is best described in relation to its use in a vehicular multiplexed network having data and power lines and controlled by a central control module, where power is carried to a number of of vehicle components and devices.

In a vehicle, many peripheral devices are controllable by the operator from within the cab on an instrument panel. These devices may include head lamps, back up indicator lamp, air conditioning fan, windshield wiper motor, and cab light. Many other vehicle components such as sensors and solenoids are not directly controlled by the operator, but nevertheless are indirectly activated. It can be appreciated that both types of components and devices as enumerated above may be connected to the smart power connector to be included in the multiplexing network.

As the vehicle operator turns on the fan and sets the speed to high, this setting is relayed to the central control module. The central control module issues a "high fan speed" command in response to the operator input and transmits the command onto the multiplexing network via the data lines. This command message is passed around the loop network until the smart power connector connected to the fan receives the command and found a match between the destination ID in the message and its own ID. That connector thereafter delivers a pulse width modulated signal to the fan to switch it on high. A different type of load that does not offer varying speeds such as head lamps are switched in the same fashion, except for the difference of delivering simply an on/off signal to the device.

The smart power connector acts essentially as a T-connector, providing connection between the peripheral devices and components and the multiplexing network. The smart power connector physically breaks the data loop and buffers the messages coming across it. On the other hand, the power loops are continuous. The connection as provided by the smart power connector is easily detachable at all three connection points, so that network loop continuity is easily reestablished.

The multiplexing network as implemented with the smart power connectors is easily reconfigurable at the dealer's facility to accept additional or different accessory options. In the event of a smart power connector failure, the first body portion containing all of the electronics can be easily removed from the connector and repaired or exchanged.

Peripheral device and peripheral device harness failures can be detected by the smart power connectors and relayed back to the central control module. Failures such as open circuit, short circuit, over temperature, under voltage of the device loads are readily detected. This peripheral device diagnostic information can be relayed back to the central control module to be displayed or to activate a visual or audio signal to alert the operator or vehicle service personnel.

Other aspects, objects, and advantages of this invention can be obtained from a study of the drawings, the disclosure, and the appended claims.

I claim:

1. An electrical connector (10) for connecting a plurality of peripheral devices to a vehicular power network (12), said connector (10) comprising:
 a printed circuit board (66) having electrical components (78) mounted thereon;
 a heat conducting element (80) being in heat transfer relation with respect to at least one of said electrical components (78), said heat conducting element (80) being mounted on said printed circuit board (66);
 first housing portion (40) having first and second connecting means (44,46) for electrical connection to said vehicular network (12), and third connecting means (48) for electrical connection to said plurality of peripheral devices;
 second housing portion (42) retaining said printed circuit board (66) and heat conducting element (80), said second housing portion (42) being adapted to overlie said first housing portion (40); and
 a plurality of electrical terminals (54,56) being disposed in said second housing portion (42) and adapted for electrical connection to said first, second and third connecting means (44,46,48) when said first and second housing portions (40,42) are contiguous and in electrical connection, said first, second and third connecting means (44,46,48) each having first and second end portions (45,45',47,47',49,49'), said first end portions (45,47,49) being securely mounted to said first housing portion (40), and said second end portions (45',47',49') being detachable from said first end portions (45,47,49).

2. The electrical connector, as set forth in claim 1, wherein said second end portions of said first and second connecting means are electrically connectable with one another.

3. The electrical connector, as set forth in claim 2, further comprising means for fastening said first and second housing portions together.

4. The electrical connector, as set forth in claim 1, wherein said printed circuit board and said electrical components are set in potting, providing electrical insulation and vibration protection.

5. The electrical connector, as set forth in claim 4, wherein said potting comprises of materials selected from one of rubber and plastic.

6. The electrical connector, as set forth in claim 1, wherein said heat conducting element is in physical contact with said second housing portion to aid heat dissipation.

7. The electrical connector, as set forth in claim 1, wherein said first and second housing portions are constructed of aluminum castings.

8. The electrical connector, as set forth in claim 7, wherein said first housing portion further comprises means for mounting on a vehicle.

9. An electrical connector for controlling the flow of electric power to a plurality of peripheral devices in a vehicular loop network being adapted to transmit data bidirectionally, said network being controlled by a main controller module, and having a plurality of data and power lines, said power lines carrying a vehicular voltage level, said electrical connector comprising:
 first and second body portions, said second body portion being adapted to secure to said first body portion;
 said first body portion having:
  first, second and third inline connectors, each having a plurality of electrical connections;
  a plurality of first conductors electrically coupling said electrical connections of said first inline connector to said electrical connections of said second inline connector;
  a plurality of first terminals electrically coupled to said plurality of first conductors;
  a plurality of second terminals; and
  a plurality of second conductors electrically coupling said plurality of second terminals and the electrical connections of said third inline connector; and
 said second body portion having:
  a plurality of third terminals being adapted to electrically mate with said plurality of first terminals;
  a plurality of fourth terminals being adapted to electrically mate with said plurality of second terminals;
  a circuit board being mounted in said second body portion, and including means for selectively controlling the flow of electric power to said third inline connector; and
  a heat sink having heat transfer relations with at least one of the electrical components of said printed circuit board.

10. The electrical connector, as set forth in claim 9, wherein the electrical connections of said first and second inline connectors are adapted to connect to said plurality of power lines and data lines of said network, and the electrical connections of said third inline connector are adapted to connect to at least one peripheral device.

11. The electrical connector, as set forth in claim 9, wherein said means for selectively controlling the flow of power includes:
 voltage regulating means for converting said vehicular voltage level to a lower voltage;
 communication means for receiving a command on said data lines;
 processing means for selectively delivering a peripheral device control signal in response to said received command; and
 a plurality of power switches for delivering power to said peripheral devices in response to receiving said on/off signal.

12. The electrical connector, as set forth in claim 11, wherein said means for selectively controlling the flow of power includes processing means selectively delivering an on/off signal in response to received command.

13. The electrical connector, as set forth in claim 11, wherein said means for selectively controlling the flow of power includes processing means selectively delivering a pulse width modulated signal in response to received command.

14. The electrical connector, as set forth in claim 13, wherein said means for selectively controlling the flow of power includes a plurality of power switches for delivering power of varying current levels to said peripheral devices in response to receiving said pulse width modulated signal.

15. The electrical connector, as set forth in claim 11, wherein said power switches include error condition detecting means for delivering a status signal, said error conditions being open circuit, short circuit, over temperature, and under voltage.

16. The electrical connector, as set forth in claim 15, wherein said processing means delivers a diagnostic signal in response to said status signal indicating the occurrence of an error condition.

17. The electrical connector, as set forth in claim 16, wherein said communication means transmits said diagnostic signal onto said data lines to said main controller module.

18. The electrical connector, as set forth in claim 11, wherein said received command contains an address of a specific peripheral device.

19. The electrical connector, as set forth in claim 18, wherein said processing means decodes said address and identifies said specific peripheral device.

20. The electrical connector, as set forth in claim 20, wherein said communication means retransmits said command on said data lines in response to said decoded address corresponding to a peripheral device not associated with said electrical connector.

21. The electrical connector, as set forth in claim 20, wherein said communication means retransmits said command on said data lines of said loop network in the same direction as the direction of said received command, in response to said decoded address corresponding to a peripheral device not associated with said electrical connector.

22. The electrical connector, as set forth in claim 11, wherein said vehicular loop network includes at least two sets of power lines independent of each other, and at least two electrical connectors connected to said network.

* * * * *